United States Patent [19]

Coon

[11] Patent Number: 4,607,735
[45] Date of Patent: Aug. 26, 1986

[54] POWER UNIT FOR SELF-UNLOADING WAGON

[76] Inventor: Timothy W. Coon, Middle Lake Rd., DeRuyter, N.Y. 13052

[21] Appl. No.: 608,569

[22] Filed: May 9, 1984

[51] Int. Cl.⁴ .............................................. F16D 67/00
[52] U.S. Cl. .................... 192/11; 192/12 R; 192/15; 192/99 S
[58] Field of Search ............... 192/11, 15, 12 R, 995, 192/114 R, 83; 74/203; 474/171; 414/467, 474, 481

[56] References Cited

U.S. PATENT DOCUMENTS

| | | | |
|---|---|---|---|
| 307,839 | 11/1884 | Brey | 192/11 |
| 1,480,322 | 1/1924 | Walters | 474/171 |
| 1,916,531 | 7/1933 | Robb | 414/398 X |
| 1,956,766 | 5/1934 | Jordan | 192/11 |
| 2,406,261 | 8/1946 | Sprinkel | 192/83 X |
| 2,573,074 | 10/1951 | Von Pein | 192/83 X |
| 2,634,870 | 4/1953 | Barnum | 414/398 |
| 2,725,110 | 11/1955 | Weigel | 192/83 X |
| 2,829,924 | 4/1958 | Renner | 406/41 |
| 3,289,496 | 12/1966 | Hoover | 474/171 X |
| 3,367,459 | 2/1968 | Rubin | 192/11 |
| 3,542,102 | 11/1970 | Watkins | 406/44 X |
| 4,058,957 | 11/1977 | Roseberry | 192/11 |
| 4,187,732 | 2/1980 | Takagi et al. | 474/171 X |
| 4,213,288 | 7/1980 | Takeuchi et al. | 192/11 X |
| 4,386,540 | 6/1983 | Skaggs, Jr. | 74/805 |

FOREIGN PATENT DOCUMENTS 2978 of 1871 United Kingdom ............... 192/11

Primary Examiner—Rodney H. Bonck
Assistant Examiner—Alan G. Towner
Attorney, Agent, or Firm—Bruns and Wall

[57] ABSTRACT

A portable power unit for unloading a silage wagon which unit is adapted to be conveniently mounted on the back of the truck used to tow the wagon. The power unit comprises a gasoline engine and a gear reduction unit that is driven by the engine, the reduction unit having a splined output shaft that is adapted to be connected to the self-unloading wagon to power its conveyor. The engine drives the gear reduction unit through a normally loose belt, and a clutch is provided that takes the slack out of the belt when the clutch is engaged. The belt pulley for the gear reduction unit has a brake disc connected to it which coacts with a caliper brake. The brake is actuated by the clutch when the latter is disengaged and operates to hold the brake disc and its pulley against rotation.

9 Claims, 7 Drawing Figures

POWER UNIT FOR SELF-UNLOADING WAGON

BACKGROUND OF THE INVENTION

This invention relates generally to farm equipment, and has particular reference to a novel power unit for a self-unloading wagon or the like.

A self-unloading wagon as referred to herein is sometimes called a silage box and is used by farmers for carrying silage and other cattle feeds from the field where it is cut to the silo where it is stored. The wagon has a system of chains and a conveyor which, when connected to a source of power, operate to unload the wagon by depositing the silage in the mouth of a blower that blows the silage up into the silo. The wagon is normally towed between the field and farm by means of a tractor, and the tractor power take-off is used to drive the conveyor mechanism in the wagon.

In many cases, the fields where the silage is cut are so far from the home farm that a truck is used to tow the wagon rather than a tractor because the truck is much faster. However, when this is done, the wagon must be disconnected from the truck at the farm and then connected to a tractor so that the tractor power take-off can be utilized to unload the wagon. After the wagon has been unloaded, it is disconnected from the tractor and once again connected to the truck, all of which is very time consuming and bothersome.

The applicant is not aware of any prior art that has directly addressed itself to the problem outlined above. A preliminary search developed four patents but none is believed to be very pertinent to the present invention. These are U.S. Pat. Nos. 1,916,531; 2,634,870; 2,829,924 and 3,542,102.

SUMMARY OF THE INVENTION

The present invention provides an auxiliary power unit for unloading a silage wagon which power unit is adapted to be conveniently mounted on the back of the truck used to tow the wagon. This eliminates the necessity for disconnecting the wagon from the tow truck and connecting it to a tractor when the wagon arrives at the farm. The power unit is mounted on a flat base that can be releasably secured to the bed of the truck.

The power unit comprises a gasoline engine and a gear reduction unit that is driven by the engine, the reduction unit having a splined output or drive shaft that is adapted to be connected to the self-unloading wagon to power its conveyor. The engine drives the gear reduction unit through a normally loose belt, and a clutch is provided having an idler pulley that takes the slack out of the belt when the clutch is engaged. The belt pulley for the gear reduction unit has a brake disc connected to it and the disc coacts with a caliper brake. The brake is actuated by the clutch when the latter is disengaged and operates to hold the brake disc and its pulley against rotation.

DESCRIPTION OF THE PREFERRED EMBODIMENT

Figure 1:
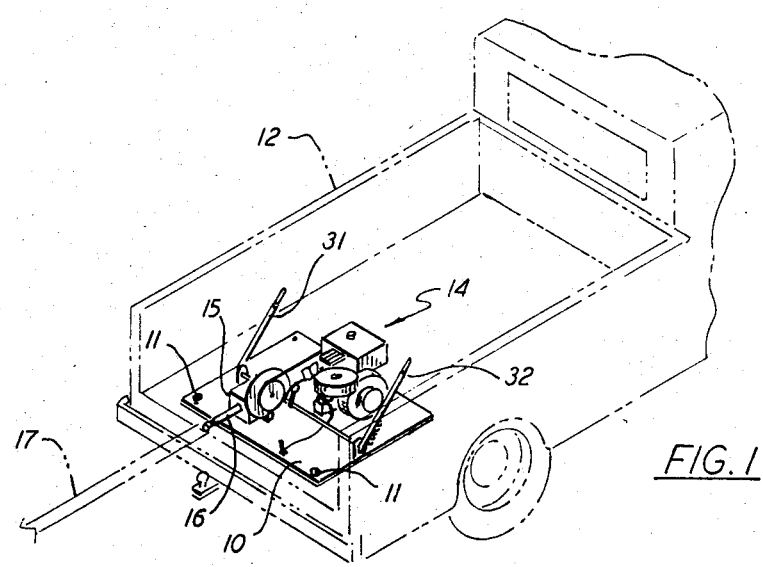
FIG. 1 is a perspective view, on a reduced scale, showing a power unit embodying the invention mounted on the back of a truck.

Having reference now to the drawings, the power power unit is mounted on a flat base 10 that is adapted to be releasably secured as by bolts 11 or the like to the back of a truck 12 as shown in FIG. 1. The power unit includes a conventional gasoline engine generally indicated at 14 and a gear reduction unit 15, the latter having a splined output or drive shaft 16. When in use, the shaft 16 is connected as by a suitable shaft 17, FIG. 1, to the self-unloading wagon (not shown) to drive its conveyor mechanism as described above.

Figure 2:
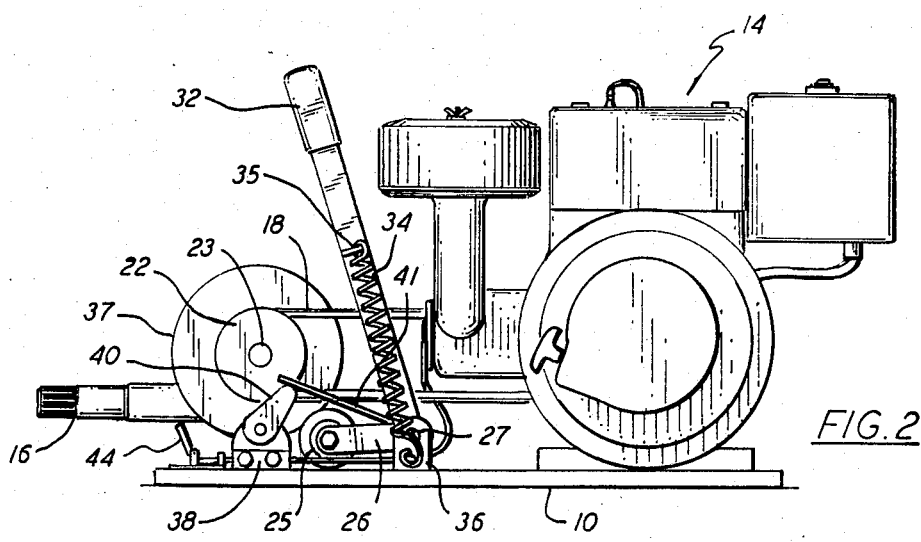
FIG. 2 is a right side elevation of the unit showing the clutch in disengaged position.
Figure 3:
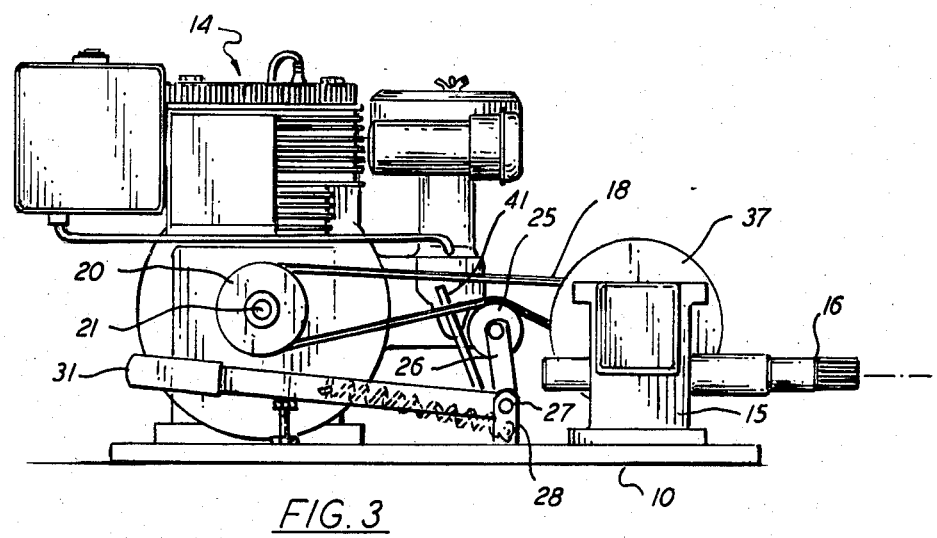
FIG. 3 is a left side elevation of the unit showing the clutch in engaged position.
Figure 4:
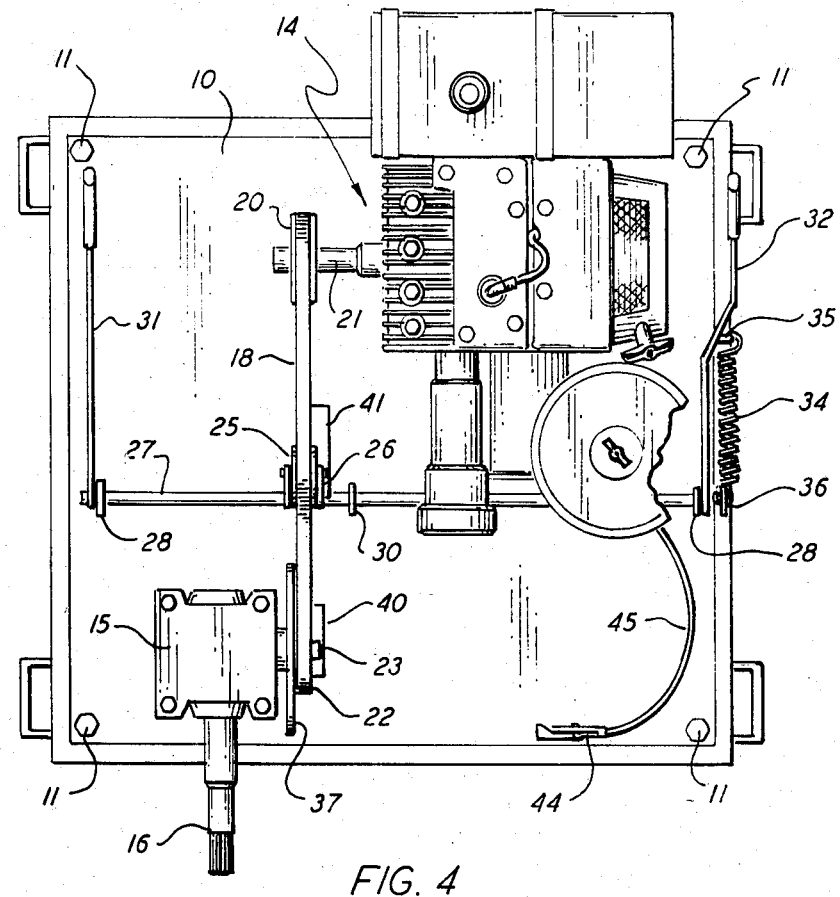
FIG. 4 is a top plan view of the unit.

The engine 14 drives the gear reduction unit 15 through a drive belt 18, FIGS. 2-4, that extends between a pulley 20 fixed on the engine drive shaft 21 and a second pulley 22 fixed on the input or driven shaft 23 of the reduction unit. The belt 18 is normally loosely mounted on the pulleys and a clutch is provided having an idler pulley 25, FIGS. 2 and 3, that takes the slack out of the belt when the clutch is engaged. The idler pulley is mounted on the outer end of a short lever 26, the inner end of which is welded or otherwise rigidly secured to a horizontal shaft 27 that extends transversely across the base 10 as shown in FIG. 4.

Figure 5:
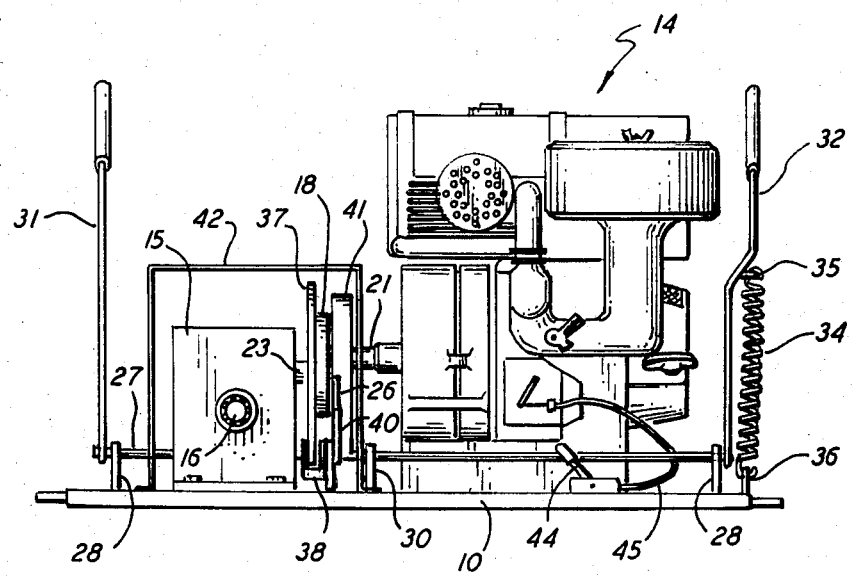
FIG. 5 is a front elevation of the unit.

The horizontal shaft 27, which forms a part of the clutch, is journalled adjacent its ends in upstanding lugs 28 and near its mid-point in an upstanding lug 30, FIGS. 4-7. A pair of hand levers 31 and 32 are respectively fixed as by welding to the opposite ends of shaft 27 for rotating same as best shown in FIGS. 1, 4 and 5. At least one of the hand levers has a coacting tension spring 34 that extends from a fitting 35 at the upper part of the handle to a lug 36 on the base 10, the connection point on lug 36 being located below the end of shaft 27 as best shown in FIGS. 3 and 5.

In the above-described clutch arrangement, the idler pulley lever 26 and hand levers 31 and 32, all of which are rigidly secured to the shaft 27, are angularly oriented with respect to one another so that when the hand levers are in their upright and slightly forward position as shown in FIG. 2, the idler pulley is out of engagement with the drive belt and the clutch is disengaged. When either hand lever 31,32 is moved towards the rear of the power unit (or towards the front of the truck) to the position indicated in FIG. 3, the idler pulley 25 is rocked up into engagement with the drive belt and the clutch is engaged whereby the engine drives the gear reduction unit 15 in the desired manner.

When the hand levers are moved to the position shown in FIG. 3 to engage the clutch, they will be releasably held in this position due to the fact that the idler pulley 25 is rocked into a position that goes beyond the vertical, FIG. 3, which is in effect an over-center position.

Figure 7:
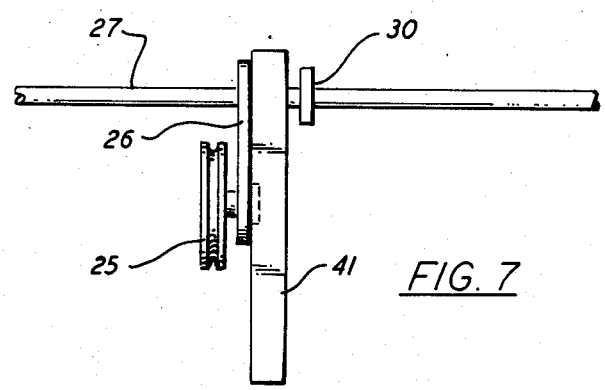
FIG. 7 is an enlarged, fragmentary plan view showing the clutch idler pulley and brake lever.

When the engine is running and the clutch is disengaged, it has been found that even a loose drive belt can turn the gears in the reduction unit. To prevent this, a disc 37 is connected to the reduction unit pulley 22 in such a manner that relative rotation between the pulley and disc is prevented, and this disc is engageable by a well-known type of caliper brake 38, FIGS. 2 and 5. Thus, the brake 38 has a lever 40, FIG. 2, that is actuated by an arm 41 when the clutch is disengaged thereby causing the brake to grip the disc 37 and keep it and the pulley 22 from rotating. The arm 41, as best shown in FIGS. 5 and 7, is welded to the shaft 27 at such an angle that when the clutch is moved into its disengaged position, FIG. 2, the arm engages the lever 40 and actuates the caliper brake. When the clutch is in its engaged position, FIG. 3, the arm is moved well out of engagement with the brake lever and the brake is inoperative.

Figure 6:
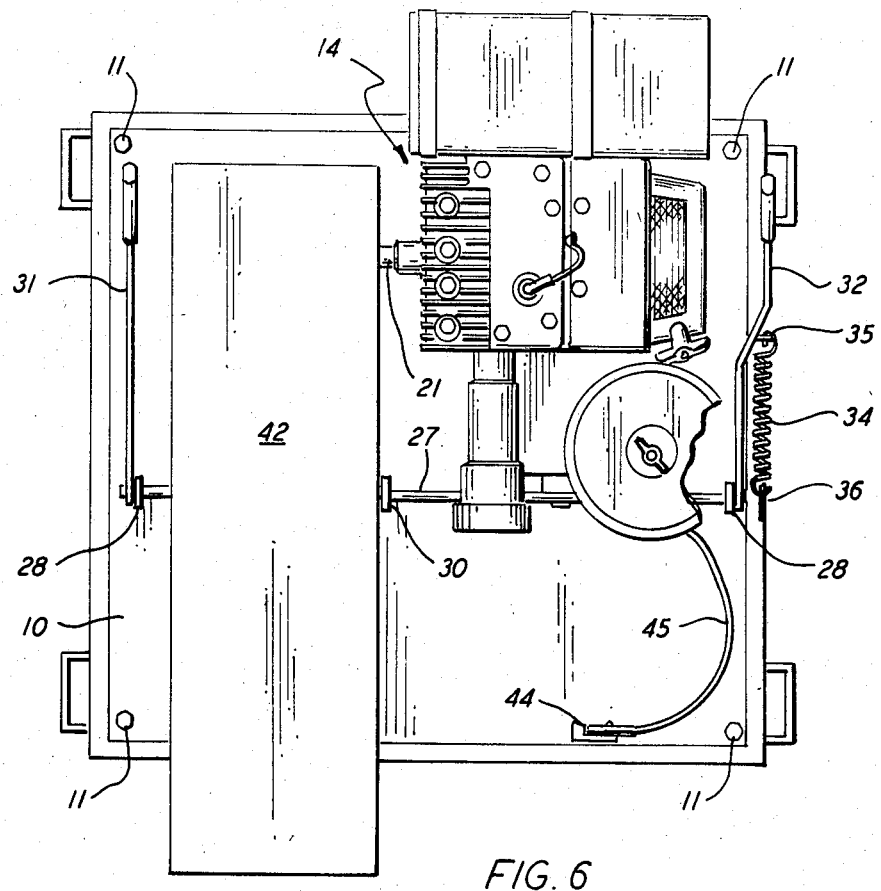
FIG. 6 is a top plan view of the unit with the protective shroud in place.

While omitted in most of the views, a safety shroud 42, FIGS. 5 and 6, forms a part of the power unit. This shroud is an inverted box-like structure, open at its front end, that is secured to the base 10 of the unit and covers all of its moving parts. For convenience, the engine throttle can be controlled by a lever 44 located adjacent the front edge of base 10, the lever being connected to the engine through suitable means such as a throttle cable 45.

From the foregoing description it will be apparent that the invention disclosed herein provides a very desirable improvement in farm machinery. As will be understood by those familiar with the art, the invention may be embodied in other specific forms without departing from the spirit or essential characteristics thereof.

I claim:

1. In an auxiliary power device to be used in place of a standard vehicle power take-off, and particularly for use with a self-unloading wagon, a power source having a drive shaft, a gear reduction unit having a driven shaft and an output drive shaft, the reduction unit output drive shaft having a fitting removably connectable to a driven input member of the self-unloading wagon, a first pulley fixed on the power source drive shaft, a second pulley fixed on the driven shaft of the gear reduction unit, a drive belt normally loosely connecting said first and second pulleys, a clutch mechanism movable between engaged and disengaged positions, the mechanism being operable in engaged position to tighten the belt so that the power source drives the gear reduction unit when the power source is operating, brake means for the reduction unit pulley, means operable when the clutch mechanism is in disengaged position to actuate the brake means whereby rotation of the reduction unit pulley is prevented, and actuator means having first and second stable positions, in said first stable position positively holding said clutch mechanism in said engaged position and in said second stable position positively holding said clutch mechanism in said disengaged position and positively actuating said brake means, so that an operator can maintain said power take-off device in an engaged or braked condition without need to remain in attendance at the device.

2. An auxiliary power device as defined in claim 1 wherein the actuator means includes a hand lever for moving the mechanism between engaged and disengaged positions, and an over-the-center spring arrangement acting on said hand lever to hold the same stably in said first and said second stable positions.

3. An auxiliary power device as defined in claim 1 wherein the clutch mechanism includes an idler pulley that is movable into engagement with the belt to tighten it.

4. An auxilary power device as defined in claim 1 wherein the brake means for the reduction unit pulley includes a disc operably connected to the pulley and a caliper brake that is engageable with the disc to prevent its rotation.

5. An auxiliary power device as defined in claim 4 wherein the clutch mechanism includes a member that is operable when the clutch is disengaged to actuate the caliper brake causing it to engage the disc.

6. In a portable an auxiliary power device to be used in place of a standard vehicle power take-off, and particularly for use with a self-unloading wagon, a gasoline engine including a drive shaft, a gear reduction unit having a driven shaft and an output drive shaft, the reduction unit output drive shaft having a fitting removably connectable to a driven input member of the self-unloading wagon, a first pulley fixed on the engine drive shaft, a second pulley fixed on the driven shaft of the gear reduction unit, a drive belt normally loosely connecting said first and second pulleys, a clutch mechanism movable between engaged and disengaged positions, the mechanism being operable in engaged position to tighten the belt so that the engine drives the gear reduction unit when the engine is running, a disc element operably connected to the reduction unit pulley, a caliper brake operable when actuated to grip the disc element and prevent its rotation, means forming a part of the clutch mechanism for actuating the brake when the clutch is in its disengaged position, and actuator means having first and second stable positions, in said first stable position positively holding said clutch mechanism in said engaged position and in said second stable position positively holding said clutch mechanism in said disengaged position and positively actuating said brake means, so that an operator can maintain said power take-off device in an engaged or braked condition without need to remain in attendance at the device.

7. An auxiliary power device as defined in claim 6 wherein the actuator means includes a hand lever for moving the mechanism between engaged and disengaged positions, and an over-the-center spring arrangement acting on said hand lever to hold the same stably in said first and said second stable positions.

8. An auxiliary power device as defined in claim 6 wherein the clutch mechanism includes an idler pulley that is movable into engagement with the belt to tighten it.

9. An auxiliary power device as defined in claim 6, wherein said actuator means includes a pair of hand levers and linkage means coupling them to said clutch mechanism, said hand levers being disposed on opposite sides of said gasoline engine.

* * * * *